US008749585B2

(12) United States Patent
Kinnan et al.

(10) Patent No.: US 8,749,585 B2
(45) Date of Patent: Jun. 10, 2014

(54) ADDING CUSTOM CONTENT TO MAPPING APPLICATIONS

(75) Inventors: Keith Robert Kinnan, Snoqualmie, WA (US); Chandrasekhar Thota, Palo Alto, CA (US); Jaya Bhatia, Bellevue, WA (US); Jeremy Eric Elson, Kirkland, WA (US); Jonathan R. Howell, Seattle, WA (US); Danyel Fisher, Seattle, WA (US); John R. Douceur, Bellevue, WA (US); Duncan Murray Lawler, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1344 days.

(21) Appl. No.: 11/731,032

(22) Filed: Mar. 29, 2007

(65) Prior Publication Data
US 2008/0238941 A1 Oct. 2, 2008

(51) Int. Cl.
*G09G 5/00* (2006.01)
(52) U.S. Cl.
USPC .......................................................... 345/634
(58) Field of Classification Search
CPC ............................ G01C 21/367; G09B 29/007
USPC ................. 345/629, 630, 634, 636, 637, 639;
340/995.14, 995.15, 995.16
See application file for complete search history.

(56) References Cited

U.S. PATENT DOCUMENTS

| 4,847,788 | A * | 7/1989 | Shimada ........................ 345/634 |
| 5,434,591 | A * | 7/1995 | Goto et al. .................... 345/688 |
| 5,760,783 | A | 6/1998 | Migdal et al. |
| 6,218,965 | B1 | 4/2001 | Gendron et al. |
| 6,314,370 | B1 | 11/2001 | Curtright |
| 6,321,158 | B1 | 11/2001 | DeLorme et al. |
| 6,593,926 | B1 | 7/2003 | Yamaguchi et al. |
| 6,985,929 | B1 | 1/2006 | Wilson et al. |
| 7,158,878 | B2 | 1/2007 | Rasmussen et al. |
| 2005/0270311 | A1 * | 12/2005 | Rasmussen et al. .......... 345/677 |
| 2006/0010100 | A1 * | 1/2006 | McAvoy et al. ................... 707/2 |
| 2006/0238383 | A1 * | 10/2006 | Kimchi et al. ............. 340/995.1 |
| 2006/0241860 | A1 | 10/2006 | Kimchi et al. |
| 2009/0073191 | A1 * | 3/2009 | Smith et al. .................... 345/629 |

OTHER PUBLICATIONS

"Earth Lights on Google Maps", Date: 2006, http://www-static.cc.gatech.edu/~pesti/night/.

(Continued)

*Primary Examiner* — Jeffery A Brier
(74) *Attorney, Agent, or Firm* — Steve Spellman; Jim Ross; Micky Minhas

(57) ABSTRACT

Digital maps can be composed of a series of image tiles that are selected based on the context of the map to be presented. Independently hosted tiles can comprise additional details that can be added to the map. A manifest can be created that describes the layers of map details composed of such independently hosted tiles. Externally referable mechanisms can, based on the manifest and map context, select tiles, from among the independently hosted tiles, that correspond to map tiles being displayed to a user. Subsequently, the mechanisms can instruct a browser, as specified in the manifest, to combine the map tiles and the independently hosted tiles to generate a more detailed map. Alternatively, customized mechanisms can generate map detail tiles in real-time, based on an exported map context. Also, controls instantiated by the browser can render three-dimensional images based on the combined map tiles.

18 Claims, 6 Drawing Sheets

(56) References Cited

OTHER PUBLICATIONS

"ImageBuilder Dynamic Server with Overlays Application Programmer's Interface (API) Documentation v4.4.1", Date: 2006, http://www.globexplorer.com/download/imagebuilder_dynamic_server_api.pdf.

ILOG JViews Maps 8.0 Using the Map Builder, Date: Nov. 2006, http://www.ilog.com/products/jviews/maps/documentation/usrbldextmaps.pdf.

"Microsoft Virtual Earth", Date: 2007, http://download.microsoft.com/download/3/d/4/3d48d693-284f-4e59-8624-b2eca6663509/VEGovSolutions.pdf.

\* cited by examiner

ADDING CUSTOM CONTENT TO MAPPING APPLICATIONS

BACKGROUND

Paper-based map designers have always faced a Hobson's choice: they could choose to include greater amounts of detail and create a map that was either too large or too cluttered, or they could choose to remove details and create a map that did not contain the relevant information needed by its users. Digital maps accessed via a computing device do not present such a choice. Instead, because the level of detail displayed can be adjusted by the user, such as through a zoom function, digital map designers can include as much detail as can be conveniently and efficiently created, stored and accessed. User control of the amount of detail displayed, and the geographic area displayed, enables each user of a digital map to customize the displayed map for their own purposes.

However, while greater amounts of information can be efficiently consumed by the user of a digital map, and increase the user's perceived value of the digital map, the collection, maintenance and storage of such information can limit the amount and type of information typically provided by digital map publishers. Map information that frequently changes can require continuous collection and updating efforts on the part of the digital map publisher, which can be both time consuming and costly. For example, public transportation routes can frequently change and, if such details are to be part of the digital map, the digital map publisher must first monitor the appropriate sources of the public transportation routes, and must subsequently collect the new route information when it is changed and, finally, must modify the existing digital map data accordingly. Even if map information does not frequently change, the sheer quantity of information can limit the ability of the digital map publisher to provide such information. For example, satellite imagery can be useful for years before it needs to be updated. However, detailed satellite imagery can require hundreds of gigabytes of storage space and, even more costly, it can require large amounts of network throughput if the digital map is to be provided to users through a network connection.

Historically, digital maps were published via portable computer-readable media, such as floppy disks or compact disks. The storage capacity of such computer-readable media limited the amount of detail that publishers could include with digital maps. More recently, especially with the growth of the Internet and the World Wide Web, digital maps are also provided to users through network connections. Such network-accessed digital maps still suffer from storage constraints, though the quantity of storage available can be orders of magnitude larger. Furthermore, the throughput of the network connections of digital map publishers can likewise limit the amount of detail that digital map publishers can provide to large numbers of simultaneous users. For example, ultra-fast multi-gigabit connections can support only a handful of simultaneous users if each user is requesting large quantities of detailed digital map data.

SUMMARY

Digital maps, especially those accessible over a network, can provide a canvas upon which a vast quantity of data can be presented. While such data would have been traditionally added to the map by the map publisher, it can be more efficient to provide mechanisms by which others can add specific details to the map. Consequently, the level of detail available to consumers of these digital maps can significantly increase without any attendant increase in the storage or bandwidth needed by the map publisher.

An interface can provide standardized mechanisms by which individual detail publishers can overlay their details upon digital maps provided by a map publisher. In one embodiment, both the digital maps, and the subsequent, independently hosted, details can be provided in the form of tiles of images downloaded by a browser from network storage media. The interface can be implemented as one or more scripts, executable by the browser, to enable the browser to identify the appropriate tiles of both map data and detail data. The one or more scripts can further provide instructions to the browser regarding the display of the map and detail data, including, for example, the opacity of the tiles of detail data and the display order of the tiles of detail data if there are multiple layers of such tiles.

In one embodiment, the interface can provide appropriate hand-off mechanisms by which an independently implemented mechanism can be referenced to provide, to the browser, pointers to the relevant detail layer tiles that are to be presented in conjunction with the map tiles. Such hand-off mechanisms can provide relevant information, including boundary and zoom information, by which the independently implemented mechanism can determine which detail-layer tiles correspond to the displayed map tiles.

In another embodiment, a Uniform Resource Locator (URL) can be used to convey appropriate information necessary to identify map detail tiles corresponding to displayed map tiles. To enable programmatically unskilled individuals the ability to add details to a digital map, the URL with the relevant information can be constructed for a user based on choices made by the user via common user interface elements. For example, text-entry fields and sliders can enable a user to specify how the tiles of map details will be displayed. The user's settings can then be incorporated into an automatically constructed URL.

To facilitate the selection of relevant map detail tiles, and to facilitate their display with map tiles, a declarative representation of the detail layer can be created, specifying relevant information in a predefined manner. In one embodiment, such a declarative representation can take the form of an extensible Markup Language (XML) manifest. The declarative representation can be referenced by the interface, or independently implemented mechanism, to both generate pointers to the appropriate map detail tiles, and to instruct the browser regarding their display.

In a still further embodiment, mechanisms for providing a three-dimensional display can be used with the combination of the map detail tiles and the map tiles, to generate three-dimensional map imagery that includes the details from the detail layer. Such three-dimensional display mechanisms can be provided with the relevant detail layer tiles, and the relevant display criteria for those tiles. However, instead of relying on the display capabilities of the browser, the three-dimensional display mechanisms can themselves generate an appropriate display using, not only the provided data, but also elevation data corresponding to the relevant map tiles, and mathematical formulae for visualizing a three-dimensional surface on a two-dimensional display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
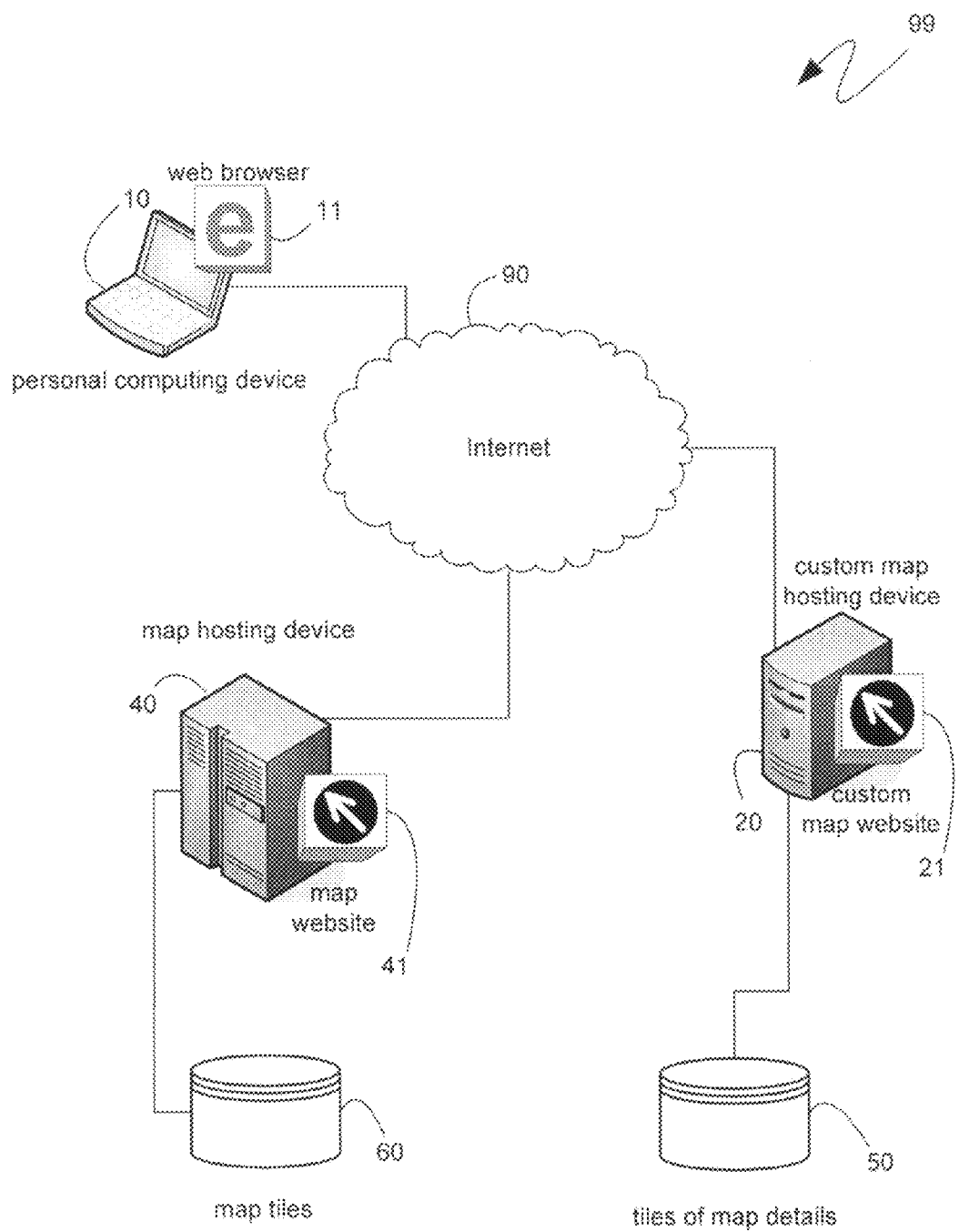
FIG. 1 is a diagram of an exemplary system that provides context for the described functionality.

The following description relates to the independent provision of details on digital maps provided by a digital map publisher. An application, such as a specific digital map reader, or a more general network or image browser, can be used to display sections, or "tiles," of a digital map. Further details can be provided by overlaying additional tiles with those details over the digital map tiles. Such further details can be generated, maintained, stored and provided independently of the map tiles. Interface mechanisms can facilitate the overlaying of independently provided details by selecting appropriate tiles that comprise the independently provided details and that correspond to the map tiles being shown. Such interface mechanisms can reference declarative specifications of each detail layer to identify the appropriate tiles and to instruct the application to display such map and detail tiles appropriately. Alternatively, greater ease of use can be provided by soliciting specific inputs from a user, such as through a user interface, and automatically generating a pointer to appropriate map detail tiles based on the user's selections. Once identified, the map and detail tiles can be displayed by either the application, or a combination of the application and external display mechanisms designed to simulate three-dimensional views of the map and details based on relevant elevation data and appropriate mathematical imaging manipulation mechanisms.

The techniques described herein focus on the presentation of map data and detail data as obtained from one or more network sources accessible via a network browser, such as the ubiquitous "web browser." However, such descriptions are not meant to suggest a limitation of the described techniques to only the display of map and detail data obtained from the World Wide Web, or only to the display of map and detail images within the context of a web browser. To the contrary, the described techniques are equally applicable to local content, such as map tiles and detail tiles stored in one or more folders on a hard drive or other local storage medium. Similarly, the described techniques are also equally applicable to the display of map and detail data by applications written specifically for such data and designed to enable common interactive commands used to view maps, such as scrolling around the map and zooming in to or out of specific regions of the map. Such customized applications can make use of the external mechanisms described herein, or they can be modified to incorporate such mechanisms themselves.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 99 is illustrated, providing context for the descriptions below. The exemplary system 99 can be part of the Internet 90, as illustrated, though the reference to the Internet is strictly an example and is not intended to limit the descriptions to Internet protocols, such as the Transmission Control Protocol (TCP), the Internet Protocol (IP), or any other Internet-specific technology. Exemplary system 99 includes a personal computing device 10 and website hosting computing devices 20 and 40 connected to the Internet 90. Each of the website hosting devices 20 and 40 hosts a website 21 and 41, respectively, which can be browsed from the personal computing device 10 with a web browser 11. More precisely, the various web pages of websites 21 and 41 can be read and displayed by web browser 11. As will be known by those skilled in the art, the collection of websites hosted by computing devices connected to the Internet 90 is commonly referred to as the World Wide Web. However, as with the reference to the Internet itself, the reference to the World Wide Web is strictly exemplary and is not intended to limit the descriptions to HTTP, HTML, or any other World Wide Web-specific technology.

Website hosting computing device 40 is a map hosting device having a map website 41 providing digital maps that can be viewed and interacted with through the web browser 11. The digital maps provided by the map website 41 can be composed of map tiles 60. More specifically, the map website 41 comprises instructions for the browser 11 which enable the browser to determine which of the map tiles 60 are to be displayed.

In one embodiment, the website hosting device 20 is a custom map hosting device having a custom map website 21 for displaying maps with customized content in the form of additional details beyond those offered by the map website 41. For example, the custom map website 21 can display the standard map elements provided by the map website 41, but can further display details such as current traffic conditions, bike trails, public transportation routes, more detailed satellite imagery, zoning information, building layouts, or any other details that have meaning within the context of the maps of the map website 41. As with the maps of website 41, the customized maps of website 21 can be assembled from tiles. However, rather than duplicating the information already present in the map tiles 60, the custom map website can generate, maintain and store tiles of only the additional map details to which the custom map is directed. Such tiles of map details 50 can be combined with the map tiles 60 by the browser 11 to generate the custom maps that are nominally provided by custom map website 21. More specifically, the web pages of the custom map website 21 can utilize mechanisms, provided by, for example, the map hosting device 40, to instruct the browser 11 to generate these custom maps that comprise map tiles that are only in part stored and maintained by the custom map hosting device 20.

Initially, a user of the personal computing device 10 directs the web browser 11 to obtain information from a web page of the custom map website 21. Such a web page can comprise tagged data that can be displayed by the browser 11 in accordance with the tags. Such a web page can further comprise browser-executable instructions, including, for example, browser-executable scripts. As will be known by those skilled in the art, the web page need not directly recite browser-executable script itself, but can instead merely reference files comprising such scripts, which may be resident elsewhere on the Internet 90.

In one embodiment, the map hosting device 40 can provide browser-executable scripts for properly combining the map data present in the map tiles 60 with the map detail data present in the tiles of map details 50. Such scripts can rely on a declarative specification provided by the custom map website 21, and on the tiles of map details 50. When referenced by one or more web pages of the custom map website 21, the scripts provided by the map hosting device 40 can integrate the map tiles 60 with the tiles of map details 50 by instructing the browser 11 to combine them to form the detailed map intended by the web pages of the custom map website.

Additional features and mechanisms hosted by the map hosting device 40 can be further leveraged by one or more web pages of the custom map website 21. In one embodiment, features and mechanisms hosted by the map hosting device 40 can enable one or more web pages of the custom map website 21 to provide three-dimensional perspective views of maps comprising the details present in the tiles of map details 50. In such a case, rather than providing browser-executable script that leverages built-in browser display functionality, the map hosting device 40 can host a downloadable component that can be instantiated by the browser 11 and can perform graphical manipulation of the relevant map tiles 60 and tiles of map details 50 so as to provide an appropriate three-dimensional perspective. Elevation data, which can be used by the downloadable component to generate the three-dimensional perspective, can be maintained by the map hosting device 40 together with the map tiles 60.

In another embodiment, features and mechanisms hosted by the map hosting device 40 can provide a user interface that can generate a pointer, known as a Uniform Resource Locator (URL) within the Internet-centric context of FIG. 1, that has sufficient information to enable the combination of specific tiles from both the map tiles 60 and the tiles of map details 50. For example, a web page of the map website 41 can provide a user interface for generating a URL that identifies a web page of the custom map website 21. Additional information in the URL can be used by the custom map website 21, in conjunction with the browser-executable scripts hosted by the map hosting device 40, to instruct the web browser 11 to generate a map image based on map tiles 60, tiles of map details 50, and the settings selected via the provided user interface.

Figure 2:
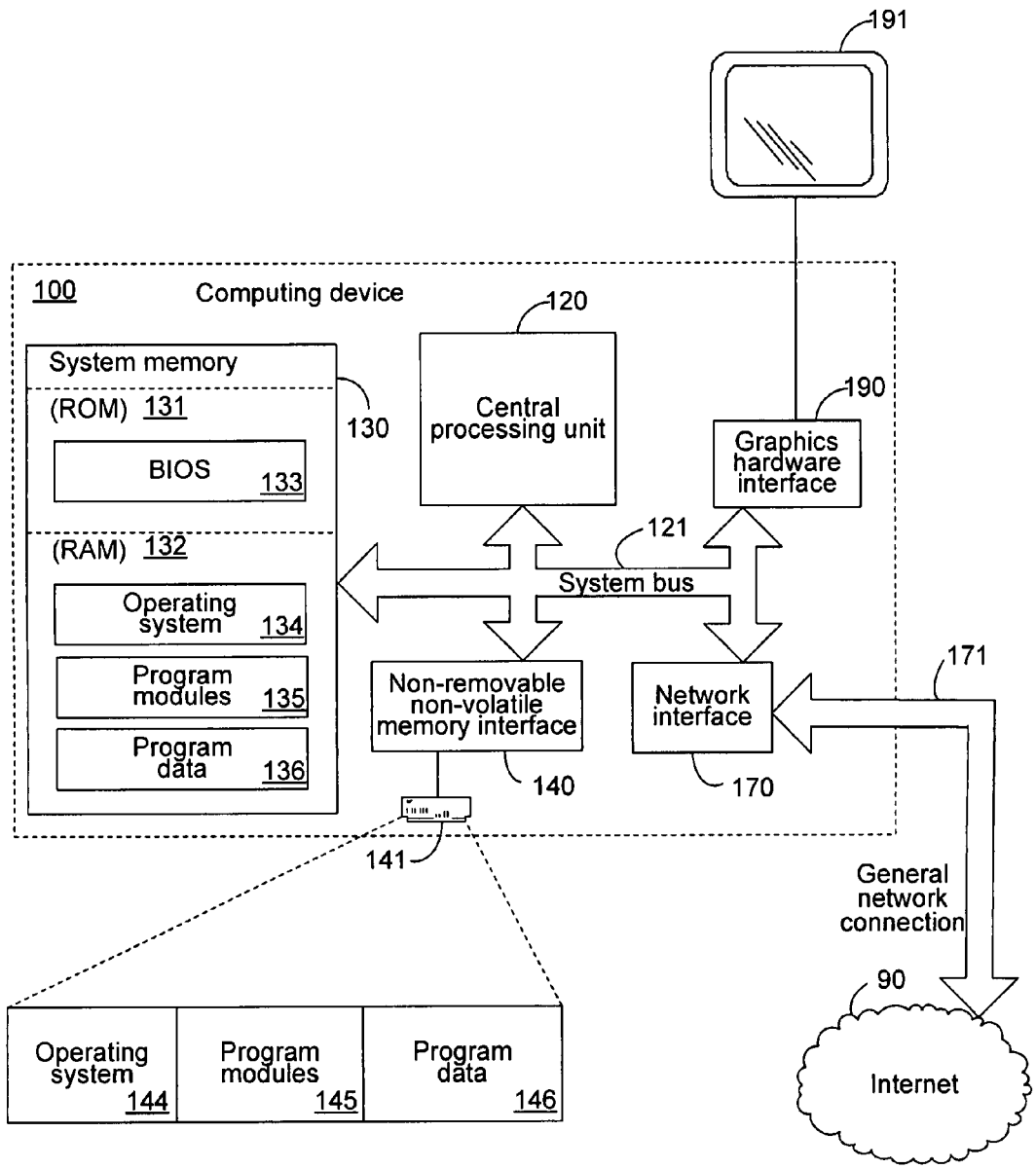
FIG. 2 is a block diagram of an exemplary computing device.

Before describing the features and mechanisms hosted by the map hosting device 40, that can be used by the custom map website 21, a brief description of the computing devices of FIG. 1 is provided with reference to an exemplary computing device 100, illustrated in FIG. 2. Any of the computing devices of system 99 shown in FIG. 1 can be of the form of the exemplary computing device 100, including the personal computing device 10 and the website hosting devices 20 and 40.

Turning to FIG. 2, the exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include the Peripheral Component Interconnect (PCI) bus and various higher speed versions thereof, the Industry Standard Architecture (ISA) bus and Enhanced ISA (EISA) bus, the Micro Channel Architecture (MCA) bus, and the Video Electronics Standards Associate (VESA) bus. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, and in conformance with the exemplary system 99 of FIG. 1, the computing device 100 is shown in FIG. 2 to be connected to the Internet 90. However, the computing device 100 is not limited to any particular network or networking protocols. The logical connection depicted in FIG. 2 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
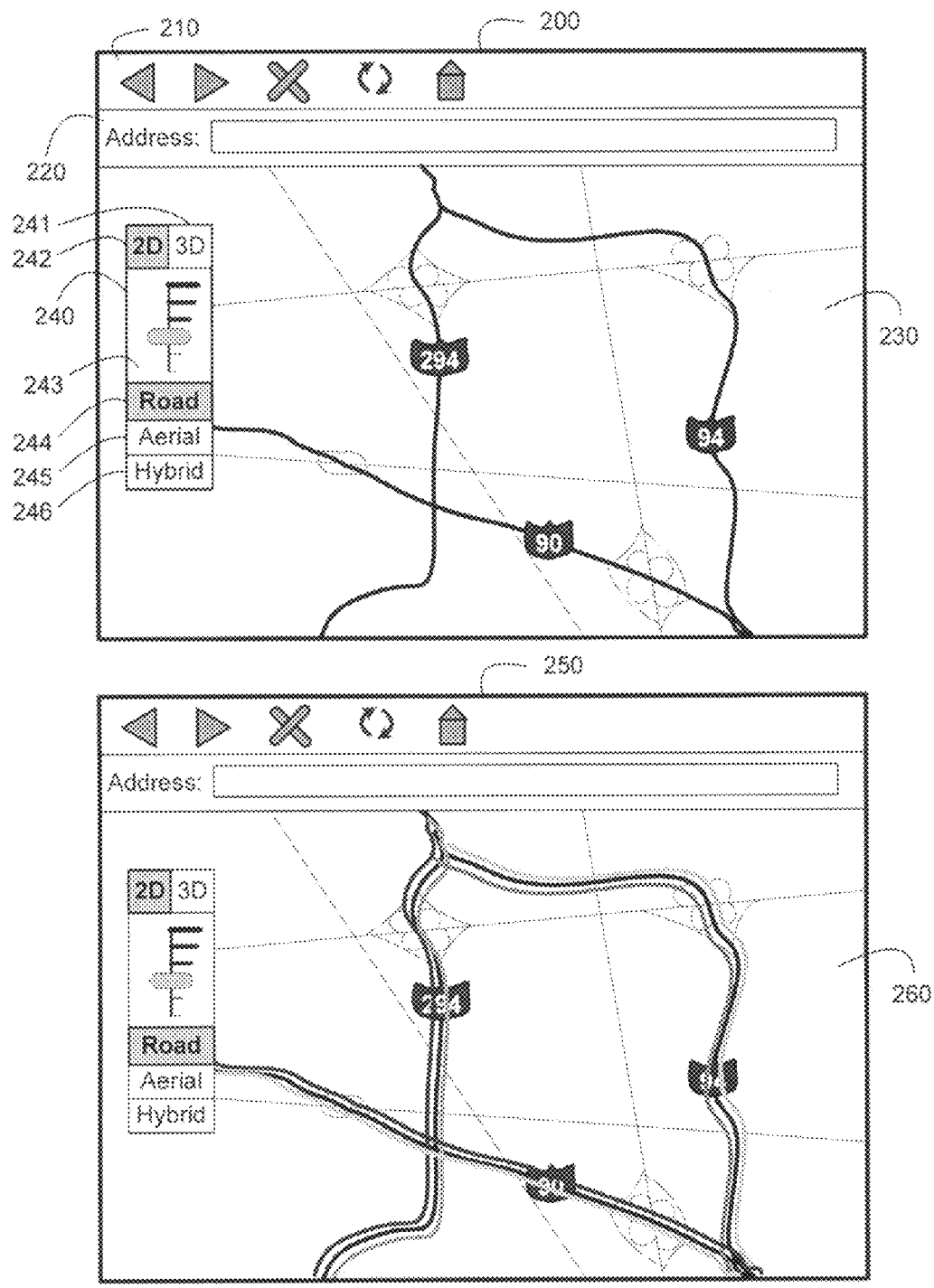
FIG. 3 is an exemplary map web page having additional independently provided detail layers.

In a World Wide Web based environment, network communications occur generally within the context of the display of one or more web pages by a web browser 11. Turning to FIG. 3, an exemplary map web page is shown in web browser displays 200 and 250. The web browser display 200 comprises a navigational toolbar 210 and a text entry field 220 for receiving and displaying the network location of the currently displayed web page. The currently displayed web page comprises an exemplary digital map 230 of an area having three highways and multiple secondary roads. The currently displayed web page further comprises a map control 240 that enables interactive control of the displayed map 230. The illustrated exemplary control 240 can include selection 242 for enabling a two-dimensional display and selection 241 for enabling a three-dimensional display. Control 240 can likewise include a zoom slider 243, enabling the user to select the scale of the map 230. Control 240 can further include display selections 244, 245 and 246, enabling the user to toggle between various types of maps, such as a road map, an aerial or satellite view, or a hybrid of the two. In addition to the map interactions enabled by the control 240, the displayed map 230 can be further interacted with by clicking, dragging or selecting sections of the map in the browser display 200.

The web page comprising the map 230 and control 240, shown in browser display 200, can be provided to the web browser 11 from a map website 41, such as would be hosted by a map hosting device 40, shown in FIG. 1. Browser display 250 of FIG. 3 shows a second web page comprising the same control 240, but a different digital map 260. As can be seen, the digital map 260 comprises the elements of digital map 230 and further comprises additional map-related details in the form of a pictorial representation of the traffic congestion along the three highways shown. The web page comprising the map 260 with traffic details, and the control 240, that are shown in browser display 250, can be provided to the web browser 11 from a custom map website 21.

In one embodiment, the web page comprising the map 260 can take advantage of mechanisms provided by the map hosting device 40 to generate the map 260 by instructing the browser 11 to combine the map information used to generate map 230 with the traffic information. In such a case, the custom map hosting device 20 need only obtain, store and maintain the traffic information, or whatever other map details it seeks to provide. The underlying map data can be the same data used to generate the map 230; namely the data maintained by the map hosting device 40.

One common approach to generating the display of the map 230 is to initially create and store small sections of the map as "tiles." Each tile is an image file that illustrates a predefined geographic area. For example, one tile can provide map data for a predefined square mile. Another tile can provide a greater amount of map data, but may only cover 100 square yards. Mechanisms implemented by the map website 41 determine, based on the zoom level selected through the control 240, and the requested location, which tiles to use to generate the map 230. Specifically, when the user selects a particular location, and a particular zoom level, mechanisms implemented by the map website 41 identify the tiles that correspond to the selected location and that have an appropriate level of detail and cover an appropriate amount of geographic area for the selected zoom level. The identified tiles are then transferred to the personal computing device 10, and are pieced together by the web browser 11, according to instructions received from the map website 41, to form a cohesive mosaic that appears as a single continuous map, such as map 230.

In one embodiment, those same mechanisms can be provided by the web hosting device 40 to external web pages, such as those that comprise the custom map website 21, to enable those web pages to overlay tiles comprising map details on top of the map tiles that comprise the basic map 230. More specifically, the custom map website 21 can utilize the same mechanisms that determines which of the map tiles 60 to transmit to the browser 11 to also determine which of the tiles of map details 50 to likewise transmit to the browser 11. The custom map website 21 can also utilize mechanisms hosted by the map hosting device 40 to instruct the browser 11 how to visually combine the selected map tiles 60 with the selected tiles of map details 50 so as to generate the map 260.

In order to provide for the proper selection of the tiles of map details 50, the custom map website can comprise a manifest that provides a declarative specification regarding the tiles of map details 50 that can be used by the exported mechanisms of the map hosting device 40 to select the appropriate tiles and instruct the browser 11 as to their proper display. In one embodiment, such a manifest can comprise the specification of the location of the tiles of map details 50, the naming structure used to reference individual tiles from among the tiles of map details, the format used to describe the geographic location represented by an individual tile from the among the tiles of map details, the transparency to be used when the browser 11 displays the tile above a tile from the map tiles 60, the boundaries, including zoom boundaries and geographic boundaries, within which appropriate map detail tiles can be found, and other analogous information.

The manifest is not limited to describing only a single layer of map details, nor are the tiles of map details 50 limited to a single set of such tiles. For example, the map 260 of FIG. 3 could include, not only an indication of traffic, but could also include public transportation routes. In such a case, the map 260 can be a layered image composed of the map tiles 60 that display the map 230 in addition to one layer of tiles from the tiles of map details 50 directed to the traffic details shown, and a second layer of tiles from the tiles of map details 50 that are directed to the public transportation routes. The manifest can further contain a specification of each layer, demarcating, for example, between the tiles that comprise the traffic map details and the tiles that comprise the public transportation map details. Such a demarcation can comprise separate specifications of the transparency of each layer, separate naming conventions used to identify the tiles from each layer and other similar separately specifiable values.

In one embodiment, the mechanisms, indicated above, provided by the map hosting device 40, can be implemented in the form of one or more scripts that can be interpreted and executed by the browser 11. More specifically, pointers to the scripts can be included in web pages from the website 21, such that the browser 11, upon parsing those web pages, would retrieve the scripts from the map hosting device 40, and execute them. The scripts, in turn, can be designed to access the manifest and, from the information contained in the manifest, and from the map context, identify the tiles, from among the tiles of map details 50, that are to be displayed by the browser 11. The scripts additionally can instruct the browser 11 as to the proper display of the tiles of map details 50, including, for example, the imaging order in which the tiles are to be displayed, and the transparency of each layer.

Figure 4:
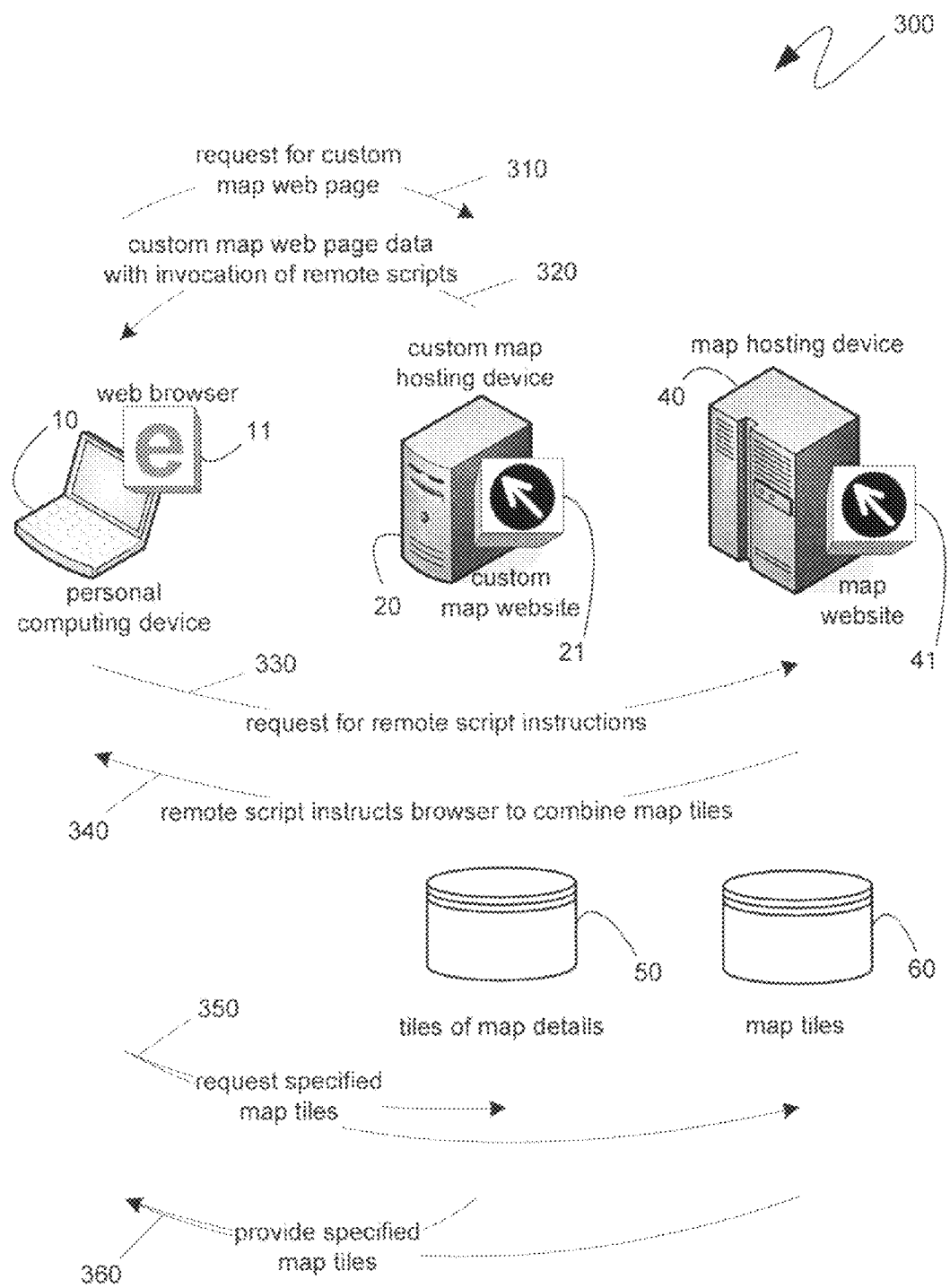
FIG. 4 is a communicational diagram illustrating an exemplary communicational flow for displaying independently provided map details on a browser.

Turning to FIG. 4, a communicational flow diagram 300 is shown illustrating the communications between the browser 11, executing on the personal computing device 10, and the web site hosting devices 20 and 40. Initially, a request 310 for a web page directed to displaying a map with specific details can be made of the custom map hosting device 20 by the web browser 11. In response to such a request, the web page data 320 can be sent from the custom map hosting device 20 to the web browser 11 on the personal computing device 10. The web page data 320 can comprise pointers to both the scripts being hosted by the map hosting device 40, and to the manifest describing the one or more layers of map details represented by the tiles of map details 50. In one embodiment, such a manifest is implemented in the form of an eXtensible Markup Language (XML) document with tags for, among other things, the location of the tiles, the opacity with which they are to be displayed, an identification of the layer of tiles if multiple layers are to be used, and the ordering in which the layers of tiles are to be stacked when generating the display.

Upon receiving the web page data 320, the browser 11 can follow the pointers provided and can make a request 330 for the scripts being hosted by the map hosting device 40. While the requested scripts are hosted by the map hosting device 40, they are provided to the browser 11, via communications 340, and are then interpreted and executed by the browser on the personal computing device 10. The scripts received by communications 340 instruct the browser as to the appropriate combination of the map tiles 60 and the tiles of map details 50. More specifically, the scripts received by communications 340 initially reference the manifest described above to verify that the manifest comprises the information required by the scripts. Subsequently, the scripts can obtain a map context indicating the current zoom level and the current location of the map that is to be displayed by the browser 11. Such a map context can be provided by the browser 11 or by the custom map web page data 320.

Once the scripts obtain the map context, they can, using the information contained in the manifest, identify the specific tiles from the tiles of map details 50 that are to be displayed by the browser. For example, one way of specifying, in the manifest, both the location of the tiles of map details 50, and the manner in which they are to be referenced, is to provide a variable URL, such as: http://tiles.mycompany.com/%4.png, where the "%4" is a variable that can be replaced with a value derived from the map context. The map context, as indicated previously, provides an indication of the current zoom level and geographic location that is to be mapped. In one embodiment, such information can be converted into a multi-part value using a predefined conversion process. For example, zoom levels can be assigned numerical values such that a zoom level of 1 represents the broadest view—for example, of an entire continent—and each subsequent zoom level value indicates the relative scope of that zoom level as compared to the zoom level having a value of 1. Thus, a zoom level with a value of 2 can have a scale twice as large as the zoom level with a value of 1. Geographic locations can be assigned numerical values based on commonly used geographic location identifiers, such as longitude and latitude. Each of these numerical values can be combined to form a multi-part value. For example, a map context having a zoom level of 16 and centered at 42.1 decimal degrees north latitude and 87.8 decimal degrees west longitude, can be referenced by the multi-part value 16421878, with the first two digits representing the zoom level, the subsequent three digits representing the latitude in decimal degrees north, and the final three digits representing the longitude in decimal degrees west.

Once the map context is obtained, the scripts provided by the map hosting device 40 can use it to identify specific tiles of the tiles of map details 50 and specific tiles of the map tiles 60 that are to be displayed by the browser 11. As indicated previously, the location of the tiles of map details 50, and the manner in which they are to be referenced, can be specified by a variable URL in the manifest provided by the custom map web page. In one embodiment, the multi-part value representing the map context can itself be used with the variable URL to identify an appropriate tile. Returning to the above example, the network address of a tile of map details representing an area centered at 42.1 decimal degrees north latitude and 87.8 decimal degrees west longitude, and having a zoom value of 16, can be http://tiles.mycompany.com/16421878.png. Thus, the script can identify that tile, and the surrounding tiles, such as by appropriately varying the value representing the map context, and can instruct the browser 11 to obtain those tiles from among the tiles of map details 50. The script can likewise identify the relevant tiles from among the map tiles 60, though such an identification can occur without reference to the manifest provided by the custom map website 21 since the script provided by the map hosting device 40 would already know how to select from among the map tiles 60.

Turning back to FIG. 4, the web browser 11 is shown, via communication 350, requesting the specified map tiles from the tiles of map details 50 and the map tiles 60, which can then be provided to the web browser 11 by the communications 360. Once the web browser 11 has obtained the appropriate image tiles, the browser can be instructed to assemble the tiles to form a coherent map image comprising the details provided by the custom map website 21. Specifically, the scripts obtained via communication 320 can reference the manifest provided by the custom map website 21 and instruct the browser 11 to display the tiles in accordance with the display priority and opacity specified. For example, as indicated previously, the manifest can specify whether the tiles of map details are displayed with complete opacity, such that the underlying map tiles are wholly visible "through" the tiles of map details, or displayed with no opacity, such that the map tiles are not visible. Alternatively, some intermediate level of opacity can be selected, such as, for example, by specifying a percentage of opacity. In one embodiment, the web browser 11 itself comprises sufficient instructions necessary to implement the required graphical processing to simulate the appearance of the tiles of map details above the map tiles with the specified level of opacity. Additionally, if the tiles of map details 50 comprise multiple layers, the manifest can specify a display priority, indicating which of the layers should be prominent, such that it is graphically presented as if it were "above" the other layer.

Figure 5:
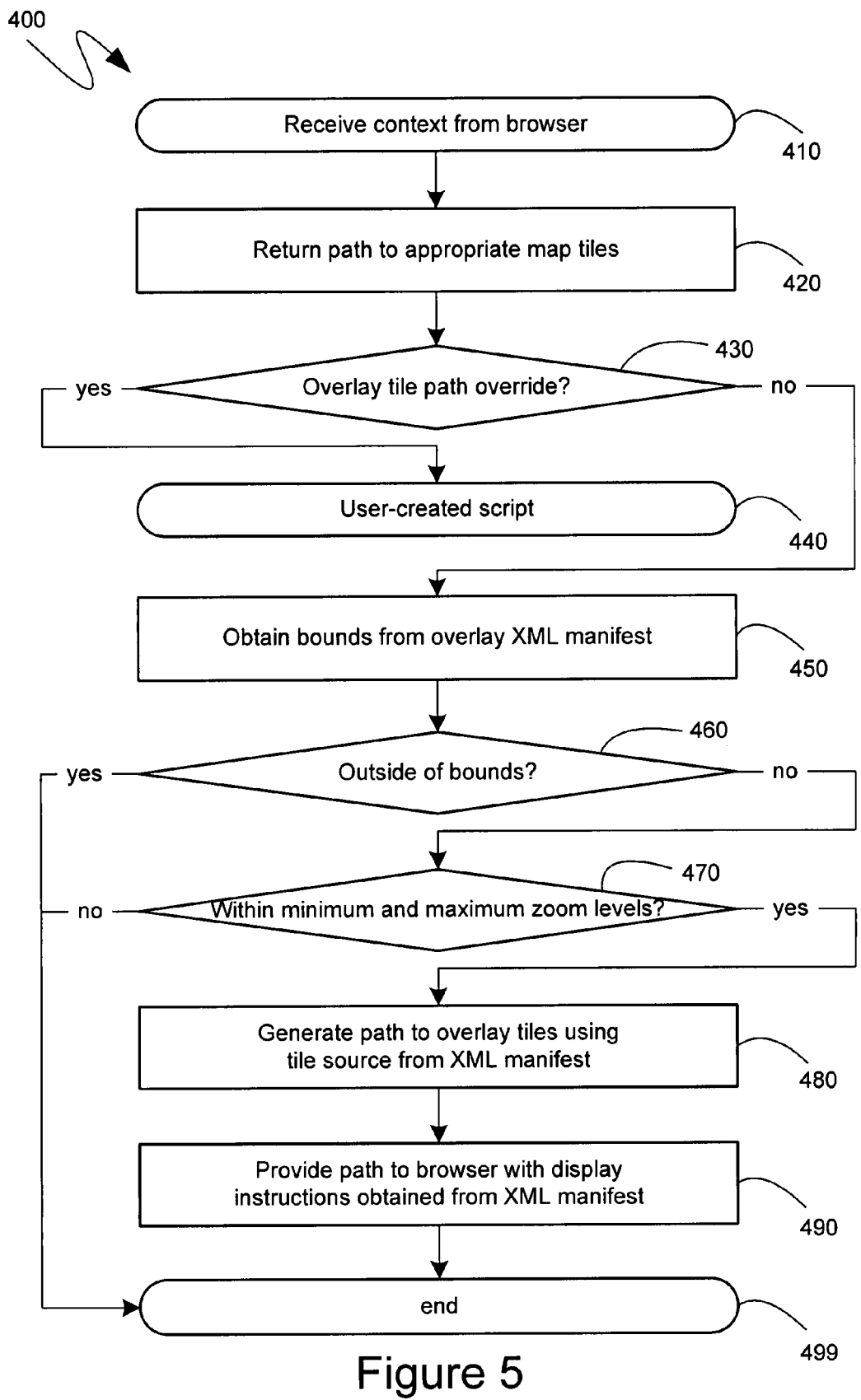
FIG. 5 is a flow diagram illustrating an exemplary process for displaying independently provided map details on a browser.

Turning to FIG. 5, a flow diagram 400 is shown, illustrating the processing performed by the scripts obtained from the map hosting device 40 via communications 320. Initially, once the scripts have been received by the browser 11 and interpreted, they can request, or otherwise obtain, a map context, as indicated by step 410. The map context can be obtained from the browser 11, or the custom map website 21, and can be used to identify which tiles, from among the map tiles 60, are to be displayed by the browser. In one embodiment, the identification of the map tiles to be displayed based on the map context can take advantage of the existing mechanisms that would have been used by the map website 41 when it would display only the base map, without any of the details added by the custom map website 21. For example, if identification of map tiles by the map website 41 was performed by back-end controls executing on the map hosting device 40, such back-end controls could be used again, in step 420, to perform the same function, namely: return the network addresses to the appropriate tiles from among the map tiles 60. Alternatively, the identification of the map tiles to be displayed based on the map context can be performed by the script itself being executed by the browser 11, such as in the manner described in detail above with reference to the tiles of map details 50.

Once the appropriate map tiles, from among the map tiles 60, have been identified at step 420, the appropriate map detail tiles from among the tiles of map details 50 can be identified. Initially, a check at step 430 can performed to determine if the custom map website 21 uses its own mechanism for identifying detail tiles from among the tiles of map details 50. Such a check can be based on, for example, the setting of a tile path override parameter within the web page. If the tile path override parameter is not set, then the default mechanisms can be used as described above, and as further described below in connection with the remaining steps of flow diagram 400. However, if the tile path override parameter specifies an alternative tile path generation mechanism, then the script obtained from the map hosting device 40 can pass control to that mechanism at step 440. In one embodiment, if the custom map website 21 uses its own mechanism for identifying the detail tiles to be displayed, those tiles need not be generated in advance and stored, such as the tiles of map details 50. Instead, each tile can be generated in real-time as it is needed. More specifically, because the custom map website 21 is not relying on a process that converts a map context into an identifier of already created tiles to be displayed, it can implement a custom designed mechanism that converts the map context into a request for one or more tiles having a specified zoom level and a specified geographic coverage. Such a request can then be forwarded to a tile generation mechanism that can, in response to the request, create the requested tiles and provide them to the browser 11.

Turning back to FIG. 5, if, at step 430, it is determined that there is no tile path override, and that the standard tile path generation mechanisms should be used, the processing of the script obtained from the map hosting device 40 can proceed to step 450, at which point it can reference the manifest to obtain the bounds of the tiles of map details 50. The specifying of bounds can be useful if the map details being provided by the custom map website 21 are not applicable for every section of the digital map provided by the map website 41. For example, turning back to FIG. 3, the traffic congestion details provided in map 260 may be available for only the immediate metropolitan area and, consequently, there may not be any tiles of map details 50 beyond such a geographic area. The geographic limit of the tiles of map details 50 can be specified in the manifest and referenced at step 450. If the map context references an area outside of the specified bounds, as determined at step 460, then the processing performed by the scripts obtained from the map hosting device 40 can end at step 499, as shown.

However, if it is determined at step 460 that the map context references an area within the specified bounds, a subsequent determination can be made at step 470 to verify that the map context is within a zoom level for which there are tiles of map details 50. As with the geographic bounds, the manifest can include the zoom limits for which there exist tiles of map details 50. While many map details can be applicable at all zoom levels, others, such as satellite imagery, may have maximum zoom limits beyond which no further detailed imagery exists. Similarly, other map details, such as nature trails, may not have any meaning beyond some minimum zoom limit, since the relevant area appears too small to meaningfully distinguish the nature trails. Consequently, if it is determined at step 470 that the map context is not within the zoom levels specified in the manifest, the processing can end at step 499, as shown.

If, however, step 470 determines that the map context is within the specified zoom levels, then the scripts obtained from the map hosting device 40 can, at step 480, generate paths to the appropriate tiles of the tiles of map details 50, such as in the manner described in detail above. As indicated above, the manifest can include the specification of a variable URL and instructions for converting a map context into specific file names that can become part of the variable URL and can identify the tiles, from among the tiles of map details 50, that are to be displayed together with the map tiles identified at step 420. Once identified, the browser 11 can be provided with the relevant path, or URL, to those tiles at step 490. In addition, at step 490, the browser 11 can be instructed how to display the specified tiles. Specifically, the opacity of the specified tiles, and their display priority can be obtained from the manifest, and preexisting display functionality of the browser 11 can be used, in conjunction with these parameters, to generate a map display having the details added by the custom map website 21.

While the above descriptions focused on the display of map tiles as two-dimensional images, they are equally applicable to simulated three-dimensional map images. In one embodiment, the map website 41 can include the ability to display simulated three-dimensional images of the maps composed of map tiles 60. More specifically, the map website 41 can comprise geographic elevation information for the geographic areas represented by the map tiles 60 and can also comprise mechanisms for graphically simulating a three-dimensional map image based this elevation information. Such a simulated three-dimensional image can be generated by applying, to the map tiles 60, known mathematical algorithms that have been developed in the graphical arts. The image manipulation performed by these mathematical algorithms can be based on the elevation information for the geographic area represented by the map tiles, and the "location" of the viewer from whose perspective the three-dimensional map is being drawn.

Turning back to FIG. 3, the map control 240 is illustrated as having a selection 241 for toggling a simulated three-dimensional view. In one embodiment, the selection of such a view causes the browser 11 to invoke a component, provided by the map hosting device 40, that can access the elevation information for the geographic area represented by the map 230 and perform the mathematical manipulations to transform the two-dimensional images that comprise map 230 into simulated three-dimensional images.

Detailed map 260 can likewise be distorted, based on the elevation information for the geographic area represented by the map 260, in order to simulate a three-dimensional view. The component, provided by the map hosting device 40, that is used to generate the three-dimensional view can be modified to accept, not only tiles from the map tiles 60, but also corresponding detail tiles from the tiles of map details 50. The component can then combine the tiles in the same manner as they would have been combined by the browser 11. For example, the component can apply the specified opacity and display ordering to generate a two-dimensional image much as the browser 11 would have. Once generated, the two-dimensional image, comprising both the base map and the details added by the custom map website 21, can be subject to the same mathematical manipulations as the component previously applied to only the map tiles 60, by themselves, in order to generate simulated three-dimensional views.

Turning back to FIG. 5, to generate simulated three-dimensional views of a map with the map details provided by the custom map website 21, step 490 can be modified to provide the path to the map detail tiles, and the display instructions, not to the browser 11 as indicated, but rather to the control, provided by the map hosting device 40. Step 420 can likewise be modified to provide the path to the map tiles to the control and not to the browser. Prior to providing such information to the control, a check can first be made to ensure that the control has already instantiated by the browser 11. If it has not, the browser 11 can be instructed to instantiate the control. Once instantiated, the control can manipulate an appropriate display area of the browser 11 and can generate the simulated three-dimensional images based on the tiles indicated at steps 420 and 490, based on the display instructions indicated at step 490, and based on elevation data maintained by the map hosting device 40. Thus, if a user were to click on, or otherwise perform a selection action on, the three-dimensional selection 241, of the map control 240, the browser 11 could instantiate the three-dimensional image generation component from the map hosting device 40, and the scripts obtained from the map hosting device could still perform the steps outlined in FIG. 5, and described in detail above, with the exception of steps 420 and 490, which could be performed in the alternative manner just described.

The above descriptions focus on the mechanisms by which a web page of the custom map website 21 can cause a web browser 11 to display maps having specific details by merging tiles of map details 50 with independently hosted map tiles 60. In some circumstances, however, it may not be practical to create an entire web page to present such maps having specific details. For example, a user may wish to annotate a map for a very specific purpose, such as indicating the route of a local parade, or marking locations that the user has visited. In such cases, especially those having small targeted audiences, the effort and expense of setting up a website, such as the custom map website, may not be practical.

Consequently, in an alternative embodiment, the above described mechanisms can be accessed by merely passing relevant parameters as part of a URL. More specifically, the scripts hosted by the map hosting device 40 can receive relevant parameters, not by reading a manifest provided by the custom map website 21, as described above, but from a "get" request specifying a URL that comprises the relevant parameters. Such a URL can take the form of a standard URL, specifying a host and file and path information on that host, with the relevant parameters appended onto the end and separated by a predetermined character, such as a tilde. In one embodiment, the order of the parameters can be predetermined, such that only the value of the parameter can be provided in the URL. In an alternative embodiment, the order of the parameters appended to the standard URL can be variable and, consequently, the parameters can take the form of name-value pairs separated by predetermined characters to clarify which parameter was assigned a given value. Because some URLs can be limited in length, any parameter that is not specified in the URL can be set to a default value when acted upon by the mechanisms described above.

Figure 6:
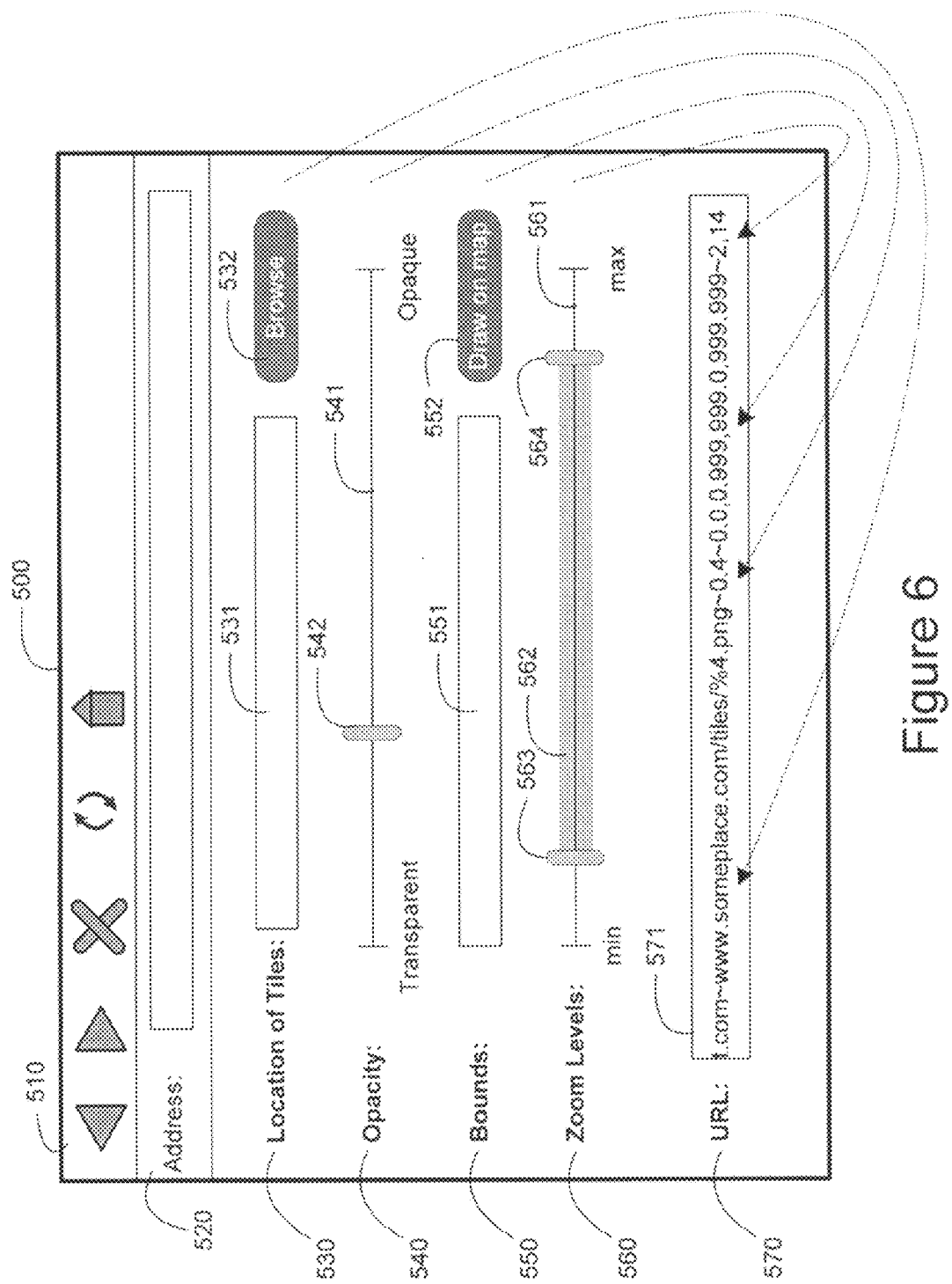
FIG. 6 is an exemplary user interface for automatically constructing a pointer to appropriate detail tiles.

In one embodiment, a graphical user interface can aid the user in the creation of an appropriately constructed URL that can be used to access a map with the user's annotations. As above, the map annotations can take the form of tiles of map details that can be displayed with the map tiles 60 to render an annotated map. Turning to FIG. 6, a browser screen 500 showing such a user interface is illustrated. As before, the browser screen 500 comprises a navigation bar 510 and an address bar 520 for entering locations and directing the browser to specific files.

The illustrated exemplary user interface aids the user in generating a URL that specifies four parameters: tile location, opacity, bounds, and zoom levels. Of course, any number of parameters could be manipulated by interface elements presented to the user. For the sake of simplicity of illustration, however, the exemplary user interface of FIG. 6 provides for only four parameters.

The location of the tiles of map details 50 that the user desires to combine with the map tiles 60 can be specified using the location of tiles user interface element 530. The location of the tiles can be entered in a text box 531, either by having the user manually enter the location directly into the text box, or by having the user select the browse button 532 to select the location of the tiles using more common user interface elements, such as a standard "file open" dialog box. As with the manifest described above, the location of the tiles can be specified in the form of a variable pointer, such as a URL having a variable component that can be changed to refer to different tiles, as dictated by the map context.

Another parameter that can be modified by the user via the graphical interface of FIG. 6 is the level of opacity 540 with which the tiles of map details 50 are to be displayed when they are layered on top of the map tiles 60. Such a parameter can vary between "transparent" and "opaque", as shown by the slider field 541, and can be set by the location of the slider bar 542 in the slider field.

A further parameter that can be set via the graphical interface of FIG. 6 is the boundary of the tiles of map details that are to be superimposed over the map tiles. As indicated above, the specification of such bounds can improve the efficiency of the rendering of the map by the browser 11, since the script will not need to generate paths to tiles of map details if the user of the browser has selected a geographic area beyond the bounds of the tiles of map details 50. As with the location of the tiles 530, the bounds 550 can be specified via a text entry field 551, either by direct textual entry by the user, or through a more graphically oriented approach, such as that exemplified by the "draw on map" button 552. As suggested by its title, the "draw on map" button 552 can enable the user's selection of the bounds 550 via a graphical interface that enables the user to merely select an area on a displayed map as an indication of the bounds.

The final parameter that can be set by the exemplary user interface shown in browser display 500 is a specification of the minimum and maximum zoom levels for which tiles of map details 50 exist. As indicated above, the overall process can be rendered more efficient if minimum and maximum zoom values are specified, since the identification of tiles of map details can be avoided if the current map context comprises a zoom level for which no tiles of map details 50 exist. In the exemplary user interface shown in FIG. 6, the minimum and maximum zoom levels can be set via slider bars 563 and 564, respectively. Specifically, the minimum zoom level for which tiles of map details 50 exists can be set by the relative location of slider bar 563 along the slider field 561 and the maximum zoom level for which tiles of map details 50 exists can be set by the relative location of slider bar 564 along the slider field 561. The intermediary zoom levels for which tiles of map details 50 do exist, can be indicated via a variable area 562 along the slider field 561.

As each of the parameters is selected through user interface elements 530, 540, 550 and 560, a URL 570 can be automatically created in the text field 571. Such a URL 570 can then be used to request the display of a map with the details or annotations provided by the user via the tiles of map details 50. As shown in FIG. 6, each of the user interface elements 530, 540, 550 and 560 can correspond to an element of the URL. As indicated previously, the URL 570 can comprise a standard URL with various parameters appended to it using separation characters, such as tildes. Thus, the URL 570 comprises a standard URL, the last part of which is visible in FIG. 6, and subsequently comprises four parameters separated by tildes. The first such parameter illustrated is the location of tiles, which can be in the form of a variable URL. Subsequently, following a tilde separation character, the opacity parameter can be included. The penultimate parameter can be the bounds of the tiles of map details 50, and the final parameter can be the minimum and maximum zoom levels.

When the user enters a URL, such as the one generated in text box 571, into a web browser address field 520, the web browser 11 can initiate a "get" request using the provided URL. This "get" request can be directed to a computing device identified by the initial portion of the entered URL, which, in one embodiment, can be the map hosting device 40. Within the map hosting device 40, such a "get" request can be routed to the map website 41, or other server software for responding to such requests. The map website 41 can parse the requested URL and retrieve the appended parameters. Rather than obtaining these parameters from the manifest, the above described mechanisms, such as the scripts described in connection with FIG. 5, can now obtain the appended parameters from the parsing mechanisms of the map website 41. After receiving the parameters, the scripts can operate as described above, and provide the web browser 11 with the appropriate map tiles and tiles of map details, and the appropriate display instructions. Thus, by making a "get" request using an appropriately constructed URL, the browser 11 can ultimately display a map comprising details or annotations, and a user can provide such a map to others by simply referencing the appropriately constructed URL, and without setting up a custom map website 21.

As can be seen from the above descriptions, a map hosting device can provide mechanisms for enabling externally hosted map details to be combined with maps hosted by the map hosting device in order to deliver, to a user, digital maps having a broad range of details. In view of the many possible variations of the subject matter described herein, we claim as our invention all such embodiments as may come within the scope of the following claims and equivalents thereto.

We claim:

1. One or more computer-readable storage devices having stored thereon computer-executable instructions for generating a digital map comprising map tiles and independently provided tiles of map details, the computer-executable instructions directed to steps comprising:
   obtaining a map context indicating a geographic region and a zoom level;
   detecting a custom mechanism for providing the tiles of map details in response to the map context;
   utilizing the map context to determine identifiers for the map tiles;
   providing the map context to the custom mechanism;
   receiving, in response to the providing, the tiles of map details and associated identifiers, wherein each associated identifier uniquely identifies only a single one of the tiles of map details;
   matching the tiles of map details to corresponding map tiles based upon the determined identifiers for the map tiles and the associated identifiers that are associated with the tiles of map details, with each matched tile of map details and corresponding map tile pair representing an equivalent geographic area; and
   causing at least some of the matched tiles of map details to be displayed superimposed over at least some of the corresponding map tiles.

2. The computer-readable storage devices of claim 1, wherein the causing the at least some of the matched tiles of map details to be displayed superimposed over the at least some of the corresponding map tiles further comprises causing the at least some of the matched tiles of map details to be displayed with a predetermined opacity with respect to the at least some of the corresponding map tiles.

3. The computer-readable storage devices of claim 2, wherein the predetermined opacity is specified in a manifest associated with the independently provided tiles of map details.

4. The computer-readable storage devices of claim 1, wherein the custom mechanism is specified in a manifest associated with the independently provided tiles of map details.

5. The computer-readable storage devices of claim 1, wherein the tiles of map details identified by the custom mechanism comprise at least two independent layers of map details simultaneously representing equivalent geographic areas.

6. The computer-readable storage devices of claim 5, wherein the causing the at least some of the matched tiles of map details to be displayed superimposed over the at least some of the corresponding map tiles further comprises: causing at least some of the matched tiles of map details representing a first layer to be displayed with a first predetermined opacity with respect to at least some of the matched tiles of map details representing a second layer and with respect to the at least some of the corresponding map tiles; and causing the at least some of the matched tiles of map details representing the second layer to be displayed with a second predetermined opacity with respect to the at least some of the corresponding map tiles.

7. The computer-readable storage devices of claim 1, wherein the custom mechanism also generates the tiles of map details identified by the custom mechanism upon receipt of the map context.

8. A method of generating a digital map comprising map tiles and independently provided tiles of map details, the method comprising the steps of:
 obtaining a map context indicating a geographic region and a zoom level;
 detecting a custom mechanism for providing the tiles of map details in response to the map context;
 utilizing the map context to determine identifiers for the map tiles;
 providing the map context to the custom mechanism;
 receiving, in response to the providing, the tiles of map details and associated identifiers, wherein each associated identifier uniquely identifies only a single one of the tiles of map details;
 matching the tiles of map details to corresponding map tiles based upon the determined identifiers for the map tiles and the associated identifiers that are associated with the tiles of map details, with each matched tile of map details and corresponding map tile pair representing an equivalent geographic area; and
 causing at least some of the matched tiles of map details to be displayed superimposed over at least some of the corresponding map tiles.

9. The method of claim 8, wherein the causing the at least some of the matched tiles of map details to be displayed superimposed over the at least some of the corresponding map tiles further comprises causing the at least some of the matched tiles of map details to be displayed with a predetermined opacity with respect to the at least some of the corresponding map tiles.

10. The method of claim 9, wherein the predetermined opacity is specified in a manifest associated with the independently provided tiles of map details.

11. The method of claim 8, wherein the custom mechanism is specified in a manifest associated with the independently provided tiles of map details.

12. The method of claim 8, wherein the tiles of map details identified by the custom mechanism comprise at least two independent layers of map details simultaneously representing equivalent geographic areas.

13. The method of claim 12, wherein the causing the at least some of the matched tiles of map details to be displayed superimposed over the at least some of the corresponding map tiles further comprises: causing at least some of the matched tiles of map details representing a first layer to be displayed with a first predetermined opacity with respect to at least some of the matched tiles of map details representing a second layer and with respect to the at least some of the corresponding map tiles; and causing the at least some of the matched tiles of map details representing the second layer to be displayed with a second predetermined opacity with respect to the at least some of the corresponding map tiles.

14. The method of claim 8, wherein the custom mechanism also generates the tiles of map details identified by the custom mechanism upon receipt of the map context.

15. One or more computer-readable storage devices having stored thereon computer-executable instructions for generating a digital map comprising map tiles and independently provided tiles of map details, the computer-executable instructions directed to steps comprising:
 obtaining a map context indicating a geographic region and a zoom level;
 obtaining a manifest providing display properties of the tiles of map details and an identification scheme for determining identifiers of the tiles of map details;
 utilizing the map context to determine identifiers for the map tiles;
 utilizing the map context and the identification scheme provided by the manifest to determine identifiers for the tiles of map details, wherein each determined identifier of the tiles of map details uniquely identifies only a single one of the tiles of map details;
 matching the tiles of map details to corresponding map tiles based upon the determined identifiers for the map tiles and the determined identifiers for the tiles of map details, with each matched tile of map details and corresponding map tile pair representing an equivalent geographic area; and
 causing at least some of the matched tiles of map details to be displayed superimposed over at least some of the corresponding map tiles.

16. The computer-readable storage devices of claim 15, wherein the causing the at least some of the matched tiles of map details to be displayed superimposed over the at least some of the corresponding map tiles further comprises causing the at least some of the matched tiles of map details to be displayed with a predetermined opacity with respect to the at least some of the corresponding map tiles, the predetermined opacity being one of the display properties provided by the manifest.

17. The computer-readable storage devices of claim 15, wherein the tiles of map details comprise at least two independent layers of map details simultaneously representing equivalent geographic areas.

18. The computer-readable storage devices of claim 17, wherein the causing the at least some of the matched tiles of map details to be displayed superimposed over the at least some of the corresponding map tiles further comprises: causing at least some of the matched tiles of map details representing a first layer to be displayed with a first predetermined opacity with respect to at least some of the matched tiles of map details representing a second layer and with respect to the at least some of the corresponding map tiles; and causing the at least some of the matched tiles of map details representing the second layer to be displayed with a second predetermined opacity with respect to the at least some of the corresponding map tiles.

* * * * *